(12) United States Patent
Lanzatella et al.

(10) Patent No.: US 7,293,030 B2
(45) Date of Patent: Nov. 6, 2007

(54) METHODS, FUNCTIONAL DATA, AND SYSTEMS TO REPRESENT A STORAGE ENVIRONMENT

(75) Inventors: Thomas W. Lanzatella, Minneapolis, MN (US); Graham Bromley, Dublin, CA (US); John O. Colgrove, Los Altos, CA (US); Ron Karr, Palo Alto, CA (US); Blaine T. Cuykendall, San Jose, CA (US); Oleg Kiselev, Palo Alto, CA (US); Craig Harmer, San Francisco, CA (US); Allen Unueco, Bellevue, WA (US); Steven Michael Umbehocker, Mercer Island, WA (US)

(73) Assignee: Symantec Operating Corporation, Cupertino, CA (US)

( * ) Notice: Subject to any disclaimer, the term of this patent is extended or adjusted under 35 U.S.C. 154(b) by 251 days.

(21) Appl. No.: 09/997,602

(22) Filed: Nov. 29, 2001

(65) Prior Publication Data
US 2003/0101189 A1    May 29, 2003

(51) Int. Cl.
*G06F 17/30* (2006.01)
(52) U.S. Cl. .................... 707/101; 707/102; 707/203; 707/205
(58) Field of Classification Search ............... 707/3–5, 707/8–9, 201, 100
See application file for complete search history.

(56) References Cited

U.S. PATENT DOCUMENTS

| | | | | |
|---|---|---|---|---|
| 5,555,351 A | * | 9/1996 | Craig et al. | 358/1.15 |
| 5,991,542 A | | 11/1999 | Han et al. | 395/712 |
| 6,029,168 A | * | 2/2000 | Frey | 707/10 |
| 6,101,513 A | * | 8/2000 | Shakib et al. | 715/527 |
| 6,161,109 A | * | 12/2000 | Matamoros et al. | 707/203 |
| 6,466,978 B1 | * | 10/2002 | Mukherjee et al. | 709/225 |
| 6,571,294 B2 | * | 5/2003 | Simmon et al. | 709/234 |
| 6,795,830 B1 | * | 9/2004 | Banerjee et al. | 707/200 |
| 6,938,059 B2 | * | 8/2005 | Tamer et al. | 707/205 |
| 2002/0004816 A1 | * | 1/2002 | Vange et al. | 709/202 |
| 2003/0061278 A1 | * | 3/2003 | Agarwalla et al. | 709/203 |

OTHER PUBLICATIONS

"Storage Area Networking—High-Speed Data Sharing Among Multiple Computer Platforms", *Tivoli Systems, Inc., Copyright 2000*, http://www.tivoli.com/products/documents/whitepapers/san_datasharing_wp.pdf, (2000), 4 pages.
"Storage management—Best Practices", *Copyright 2001, IBM Corp.*, http://www.tivoli.com/products/documents/whitepapers/wp-storage-bp.pdf,(2001), 11 pages.
Amiri, Khalil.S. ,"Scalable and manageable storage systems", *Ph.D. Thesis, Dept. of Electrical and Computer Engineering*, Carnegie Mellon University, Pittsburgh, PA, http://www.pdl.cmu.edu/PDL-FTP/NASD/amiri_thesis.pdf,(Dec. 2000),i-241.
Wylie, Jay.J. ,et al. , "Selecting the Right Data Distribution Scheme for a Survivable Storage System", *Research Paper, School of Computer Science*, Carnegie Mellon University, Pittsburgh, PA, http://www.pdl.cmu.edu/PDL-FTP/Storage/CMU-CS-01-120. pdf,(May 2001),pp. 1-21.

* cited by examiner

*Primary Examiner*—Debbie Le
(74) *Attorney, Agent, or Firm*—Meyertons Hood Kivlin Kowert & Goetzel, P.C.; B. Noël Kivlin (57) ABSTRACT

Methods, functional data, and systems for logically representing a storage environment are provided. A target storage environment having one or more storage data objects is mapped to a data structure. Any subsequent disparate or remote but similar storage environment has direct or indirect access to the data structure such that one or more of the data objects are permissibly directly/indirectly referenced or replicated within the disparate or remote but similar storage storage environment. Changes to the data structure are communicated, thereby ensuring the reliable use of the representation for the target storage environment.

26 Claims, 5 Drawing Sheets

METHODS, FUNCTIONAL DATA, AND SYSTEMS TO REPRESENT A STORAGE ENVIRONMENT

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright© 2001, VERITAS Software Company, All Rights Reserved.

FIELD OF THE INVENTION

The present invention is related to modeling storage environments, and more particularly to methods, functional data, and systems for logically representing a storage environment.

BACKGROUND INFORMATION

Storage networking is the practice of connecting storage devices to computing devices (e.g., clients, servers, and the like) by using Fibre Channel networks instead of traditional point-to-point small computer system interface (SCSI) channels. A network used to connect servers to storage devices is referred to as a storage area network (SAN). Within a SAN environment, all computing devices have access to the available storage devices. This presents a wide variety of benefits, including server platform fail-over wherein a failed storage device is automatically recovered by another operational server platform without requiring any recabling of the storage devices themselves. As will be apparent to those skilled in the art, connectivity among the computing devices and the underlying storage devices within the SAN environment is shared.

Prior to the development of SAN technology, local and wide area networks provided connectivity between computing devices that did not include storage devices. Connections were established with network protocols such as Transmission Communication Protocol (TCP), Unreliable Datagram Protocol (UDP), and others. These protocols ensure that message ordering is preserved and that messages are not lost. Distributed File Systems such as network file system (NFS) and Common Internet file system (CIFS) are layered on top of network protocols. Distributed File Systems organize access to files and correspondingly data storage elements across a network consisting of heterogeneous computing devices. The computing devices are typically organized as clients and servers, in a client-server architecture. Access to files or data storage elements is transparent to any particular computing device, such that access is consistent across the distributed file system without the need to have any private information about the physical locations or details associated with any particular file or data element.

The convenience of distributed file systems comes with an expense, since every byte of data exported by a file server managing a distributed file system must pass through the file server's memory, through the communications stack, and through a network interface controller before it reaches the application. Accordingly, the low performance and low throughput of operation associated with distributed file systems prohibit the implementation of many high performance data-sharing applications such as large scale distributed database applications, backup applications and the like. SAN environments present the opportunity to alleviate this issue by elevating storage devices within the network to peers of the clients and the servers, thereby in theory providing the opportunity of improving throughput of operation.

Yet, SAN technology has not produced advances in throughput of operations as one would anticipate. This is due to the fact that shared access to data among several compute platforms must be mediated by distributed file systems. Consequently, while the speed of connections between platforms has scaled upward with the introduction of SAN, the basic method of using distributed file systems to share data has not changed. Distributed file systems are innately restricted in the level of performance that can be achieved due to the computing overhead introduced by the communication protocol. Consequently, application writers are motivated to find strategies other than distributed file system in order to share data at speeds that are consistent with SAN technology. These strategies typically employ sharing information about files and volumes with remote application components. Using this information, an application can know everything about a file without having access to the file through a distributed file system. Additionally, the application can use this information to reference data directly on the SAN-connected storage device.

For these strategies to succeed, applications need to be able to discover sufficient information about files and volumes that a component on another platform can access the data associated with the file or volume. Customarily, this type of information is not externalized by either file systems or distributed file systems. As used herein this is referred to as private information. Private information differs from one file system operating on one computing device within the SAN and another file system operating on another computing device within the SAN. Correspondingly, data storage element portability is difficult to achieve within the confines of present SAN technology.

Furthermore, the very purpose of file system and volume manager function within an operating system is to hide the private information related to data storage elements located on one or more data storage devices. Accordingly, operating system vendors, file system vendors or volume manager vendors do not reveal or provide any useful interfaces that provide access to private information. Moreover, storage environment software stacks are complex and trying to extract the private information from existing stacks is not readily achievable without intervention from the file system software or volume manager software itself.

Moreover, private information about data storage elements is in a continual state of flux in modern data storage architectures, since at any moment in time data storage elements are moved during storage device failure, device reorganization to reduce fragmentation, and the like. Therefore, any ability to acquire private information must also entail notification that private data has been changed. Otherwise, the acquired private information may be stale or inaccurate.

In addition to performance bottlenecks, many disparate operating systems housing particular file systems can not seamlessly interact with one another since the private information about data storage elements remains largely unobtainable to application software programs. Therefore, when an organization migrates from one operating system, file system or volume manager to a different operating system, file system or volume manager an expensive data storage migration also ensues.

In an effort to address some of these problems some industry associations have been initiated in an attempt to standardize data storage device communication. For example, the Storage Network Industry Association (SNIA) and the National Committee for Information Technology Standards (NCITS) technical committee T11 have been established. Yet, these associations are attempting to gain voluntary standardization for storage device manufacturers to adhere to when developing storage devices, and therefore the work of these associations will not assist with existing storage devices, existing operating systems, existing file systems or existing volume managers. Accordingly, the success of these associations is limited in scope and has yet to be demonstrated even with newly released products and services.

Therefore, what is needed are methods, functional data and systems for providing more flexible representations of data storage objects and correspondingly data storage environments which are located on storage devices, thereby improving the ability to share information about storage objects across storage networks and permitting the development of distributed applications that operate on data that is shared by virtue of the connectivity afforded by SAN.

SUMMARY OF THE INVENTION

According to one aspect of the present invention, a method to map a storage data object is provided, wherein a reference to the data object in a first storage environment is received. The data object resides in a second storage environment. Further, a first data structure is generated from the reference and represents one or more physical locations of the data object within the second storage environment. The first data structure is retained to permit interfacing with one or more of the physical locations of the data object from the first storage environment.

According to yet another aspect of the present invention, a method to represent a data storage object is provided, wherein one or more storage locations are identified for the data storage object which is housed within a first storage environment. A hierarchical map is assembled representing a path to one or more of the storage locations. The map is used in a second storage environment to access the data storage object.

According to yet another aspect of the present invention, a first computer readable medium having a data map representing a data object residing on a second computer readable medium is provided. The map includes a first node representing the data object and a file system node representing a file system on the second computer readable medium. Furthermore, the map includes a volume node representing a volume manager associated with the file system, one or more partition nodes managed by the volume manager, and one or more disk nodes representing one or more storage devices housing the data object. In still another aspect of the present invention, a storage environment system is provided. The system includes a first file system, a second file system, and one or more data objects residing in the second file system and capable of being referenced within the first file system. The system also includes a map generated to represent one or more physical locations for each of the one or more data objects and used by the first file system when one or more of the data objects are referenced.

DESCRIPTION OF THE PREFERRED EMBODIMENTS

In the following detailed description of various embodiments of the present invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
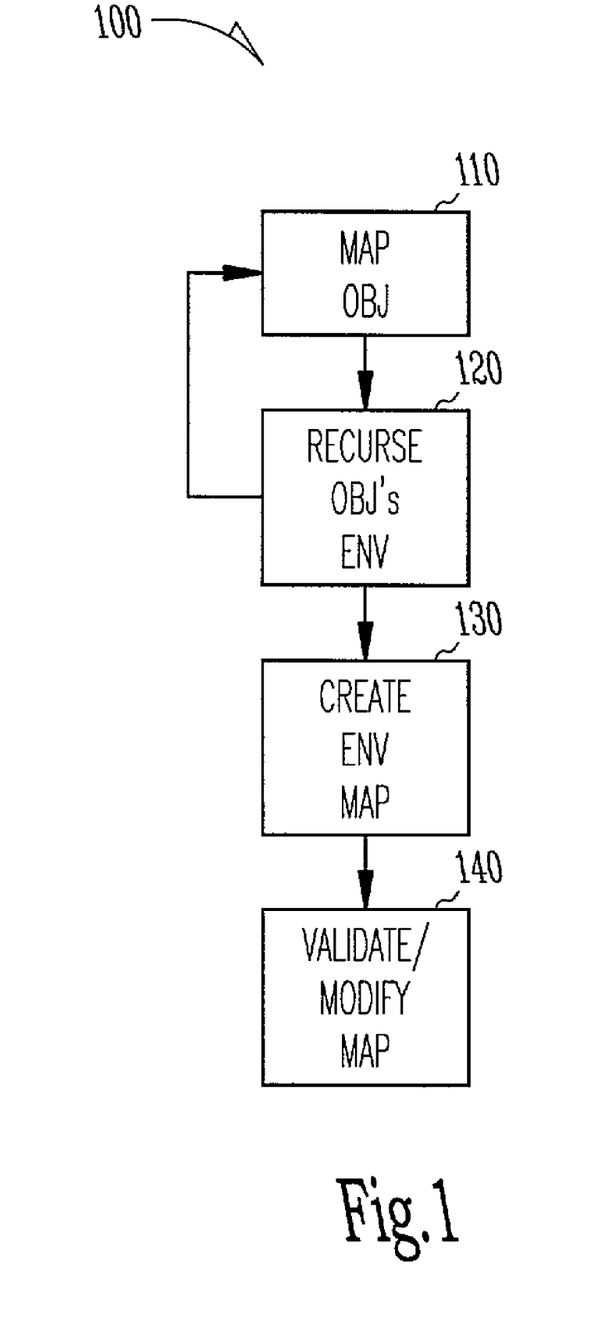
FIG. 1 shows one flowchart of a method to logically represent a storage environment according to the present invention.

Furthermore, as used herein a computing device includes one or more processing elements coupled with computer readable memory which can be volatile or non-volatile memory or any combination thereof. Additionally, the term "storage object" as used herein includes data storage elements such as, and by way of example only electronic files, portions of data related to a single electronic file, a file system, a database, a volume, a storage device partition, an entire file system, a set of file systems, and the like. FIG. 1 shows one flowchart of one method 100 to logically represent a storage environment according to the present invention. Initially, an object is mapped within the storage environment where the object physically resides.

For example, in some embodiments an initial reference to a data storage object occurs within the native storage environment wherein the object physically resides or within a remote storage environment which is interfaced through a network connection to the object's physical storage environment, such as a SAN. The reference triggers a pointer to the object to be opened and set initially to null. Next, a map domain is created by requesting the object properties of the storage object. This request returns qualitative information about the storage object. Then, a request is made for sub-objects of the current object (e.g., initial storage object reference), wherein properties of the sub-objects are retrieved. The process continues until no more sub-objects are discovered. The get object properties request, in most embodiments, is implemented as a set of executable instructions operable to access low level operating system tables and executable instructions. Further, the map domain process generates a data structure which serves as a description or a qualitative reference to the sub-objects: file systems, volumes, partitions and disks associated with the data storage object.

In some embodiments, the data structure is a tree having a root node which identifies the object being mapped. The second level of the tree includes an identification of the file system containing the data storage object. A third level of the tree identifies the volume containing the storage object's file system. The next level of the tree describes disk partitions that comprise the volume. Finally one or more disks are identified as leaf nodes of the tree, these leaves identify the exact physical storage device or devices used to store data associated with the storage object.

Of course as will be readily appreciated by those skilled in the art, a tree need not be used as the data structure representing the map of the data storage object within the data storage object's physical storage environment, since any data structure now known (e.g., lists, linked lists, arrays, hash tables, heaps, binary trees, treaps, arrays, customized classes in object oriented languages, and the like) or hereafter developed can be deployed without departing from the present invention.

Next in some embodiments, the location of data associated with a storage object is resolved. Data is described by use of extents. An extent is a 3-tuple comprised of a device identifier, a starting address and a count of the number of blocks or bytes that follow. All storage objects can be described by a list of extents. Extents can be determined for each level of the mapping domain. For example, if a storage object is a file, an application might be interested in the extents relative to the underlying volume. Similarly, an application might be interested in partition relative extents or device relative extents. Furthermore, a storage object may be contained in a volume that is mirrored to several physical devices and it can be important to locate the data associated with the object that is associated with only one image of the mirror. The map domain affords sufficient information for the application to have complete information about the storage environment and to make decisions about the relative nature of extents desired. The get extent request, in most embodiments, is implemented as a set of executable instructions operable to access low level operating system tables and executable instructions. Correspondingly, as one skilled in the art will appreciate, having the metadata of an object combined with the extents makes an object readily accessible from the referencing storage environment, independent of any specific storage stack on the referencing system.

In this way, in some embodiments, any user developed software application or set of executable instructions becomes enabled to interface with a data storage object residing on a disparate operating system. For example an application residing within MICROSOFT'S NT operating system can access and interface with a data storage object residing on a storage device controlled by a UNIX operating system.

Furthermore, in some embodiments every data storage object residing in a second storage environment is recursively mapped within the second storage environment as depicted in step 120. Accordingly, a complete map (e.g., extents and metadata) of a second storage environment is created in step 130. The original referencing storage environment then receives the assembled information resulting in complete knowledge of each referenced object within the second storage environment.

Moreover in some embodiments, each data storage object receives an identifier (or signature) that is used each time an application within the referencing storage environment attempts to access the data associated with the storage object. Identifiers are maintained by the stack elements of the system where the data is native. If the data or data location associated with the storage object is altered or modified in any way the stack element (file system, volume manager or device driver) responsible for the level of the map domain where the change occurred changes the identifier. Through maintenance of the object identifiers and with the ability of the referencing application to query the identifier for changes, the referencing application can redetermine or reacquire storage object properties or storage object extents. Accordingly, the data storage object's logical representation within the referencing storage environment is validated and/or modified as necessary in step 140. This results in an accurate view of the data associated with the storage object.

In other embodiments, metadata associated with the data storage object are retrieved and returned to a referencing application in the referencing storage environment. The metadata, in some embodiments, are returned independent from the data structure, and in other embodiments the metadata are returned with the data structure. In this way and in some embodiments, valuable information regarding a disparate file system is obtainable in the referencing storage environment, such as naming conventions, data blocking factor, partitions, and the like. Further, metadata includes any non primary data (e.g., data not physically included within the data storage object's physical location) related to the data storage object, such as modification date, security access level, byte size, data type (e.g., text, word processor, image, video, and the like), and the like. Additional data can, in some embodiments, also be associated and retrieved with the data structure such as statistical data (e.g., number of accesses, changes made to the data, and the like).

Also, in some embodiments low level executable instructions permit the operating system to communicate and provide the exact unique location of the data storage object's storage device (e.g., address of the device in the referencing environment). In some embodiments, this resolution includes the SCSI bus, target, LUN, a serial number of the device, FibreChannel world-wide name, or in other embodiments it is an Internet Protocol (IP) address. This private information provides valuable detail to the generated data structure, not normally ascertainable by a file system or operating system.

In still other embodiments, sets of executable instructions permit the virtual mounting of a foreign and remote file system onto a local file system by using the map domain and the metadata to emulate the foreign file system. In this way a WINDOW'S NT file system can logically appear as if it were mounted to a Unix file system.

As one skilled in the art will readily appreciate, the present invention provides a stable and efficient method of representing data and a data storage environment, permitting increased performance for applications needing shared access to data across a SAN. Furthermore, the present invention permits existing disparate files systems and operating systems to be interfaced with one another.

Figure 2:
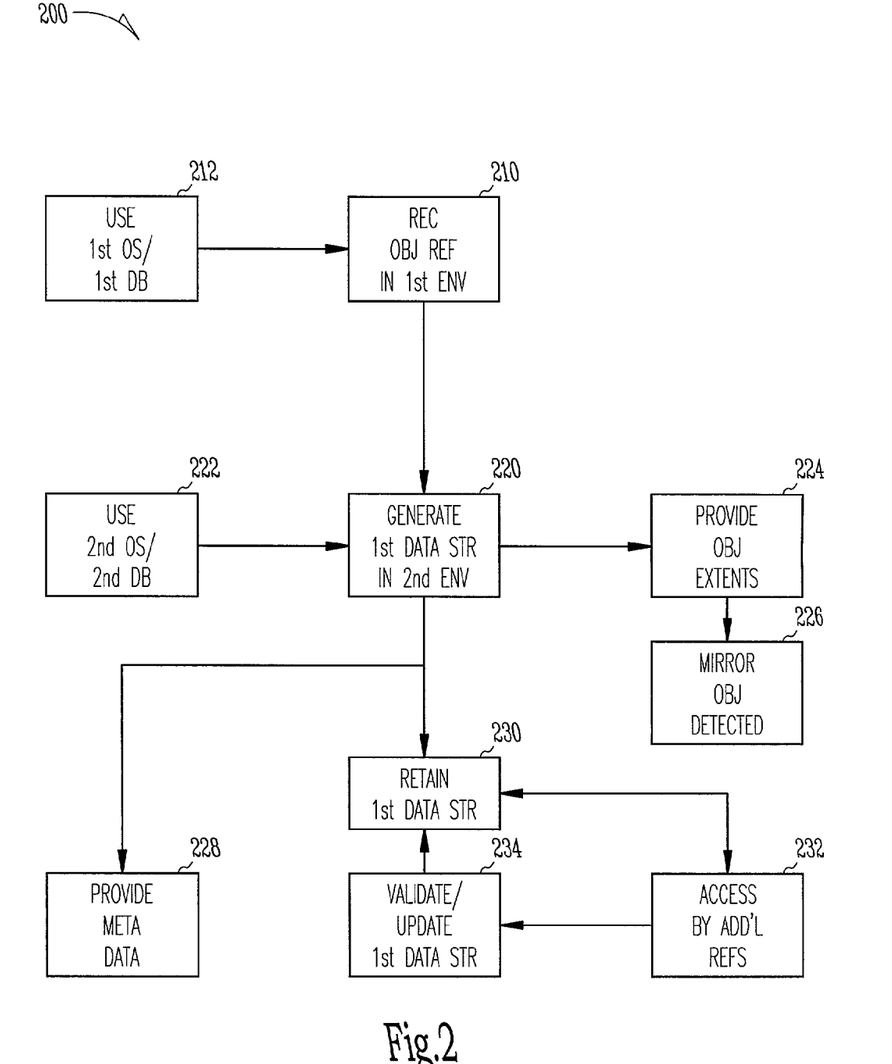
FIG. 2 shows one flowchart of a method to map a storage environment data object according to the present invention.

FIG. 2 shows one flowchart of one method 200 to map a storage environment data object according to the present invention. In step 210 a reference to a data object is received in a first storage environment. In some embodiments, the reference to the data object is intercepted by the file system of the first storage environment and determined to be a reference that resides on a second storage environment. In other embodiments, a referencing set of executable instructions issuing the reference to the data object knows in advance that the data object resides in the second storage environment.

And, in some embodiments the first and second storage environments are the same SAN environments. For example, a sharing application residing in the first storage environment can share information about local storage objects with one or more applications residing in a second storage environment, wherein both the first and second storage environments are part of the same SAN environment. In these instances, references to the local storage objects may first be acquired from the sharing application or otherwise interfaced through the sharing application.

Next, in step 220 a first data structure is generated from the reference. In some embodiments, the first data structure is a tree representing one or more physical locations of the data object within the second storage environment. Of course as is appreciated by those skilled in the art, any data structure sufficient to represent the hierarchical location and private information associated with the data object's physical location with the second storage environment is intended to fall within the scope of the present invention.

In step 230, the first data structure is retained to interface with one or more of the physical locations of the data object from the first storage environment. Retention of the first data structure, in some embodiments, is within volatile memory of a first computing device executing a referencing set of executable instructions and issuing the reference to the data object. In other embodiments, a second computing device executing a generating set of executable instructions operable to generate the first data structure within the second storage environment retains the first data structure in volatile or non volatile memory. Of course it is readily apparent, that any retention sufficient to pass the first data structure for use to the referencing set of executable instructions within the first storage environment is sufficient to fall within the scope of the present invention, notwithstanding where the retention occurs and whether the retention is in volatile or non volatile memory.

Furthermore in some embodiments, the retained first data structure is used by one or more additional references accessing the data object as depicted in step 232. In this way, if any of the physical locations associated with the data object are modified in any way, then a detection will be made with one or more of the additional references, and thereby providing a validation and an update to the first data structure, as depicted in step 234. This creates a technique for validating the representation of the data object and can help make the use of the first data structure in connection with the data object reliable and trustworthy. In some embodiments the first storage environment resides in a first operating system (e.g., step 212) which is different than a second operating system used by the second storage environment (e.g., step 222). Furthermore the first operating system, absent the interfacing with the first data structure of the present invention, lacks the ability to support the second storage environment. Moreover, in some embodiments the first data structure includes one or more extents associated with the data object (e.g., 224), alternatively the extents are provided separately from the first data structure. Also, in some embodiments, during generation of the first data structure a mirror image of the data object residing on at least two separate storage devices is detected within the second storage environment, as depicted in step 226.

In other embodiments, metadata is provided in step 228 during generation of the first data structure. As previously presented, the metadata provide information which are consumed by a referencing application within the first storage environment. The metadata, in some embodiments, include data about the data object including details of the file system within the second storage environment, and other useful information.

In still other embodiments, the method 200 of FIG. 2 is used to interface a first data base using the first storage environment (e.g., 212) with a second data base using the second storage environment (e.g., 222). As one skilled in the art will appreciate, the capability of logically representing the private information of the data object permits disparate environments and disparate applications to interface with one another. In fact, the tenets of the present invention permits disparate applications within the same storage environment to interface with one another and although the present invention is described, by way of example only, as being embodied within disparate storage environments, no such limitation is intended herein.

Figure 3:
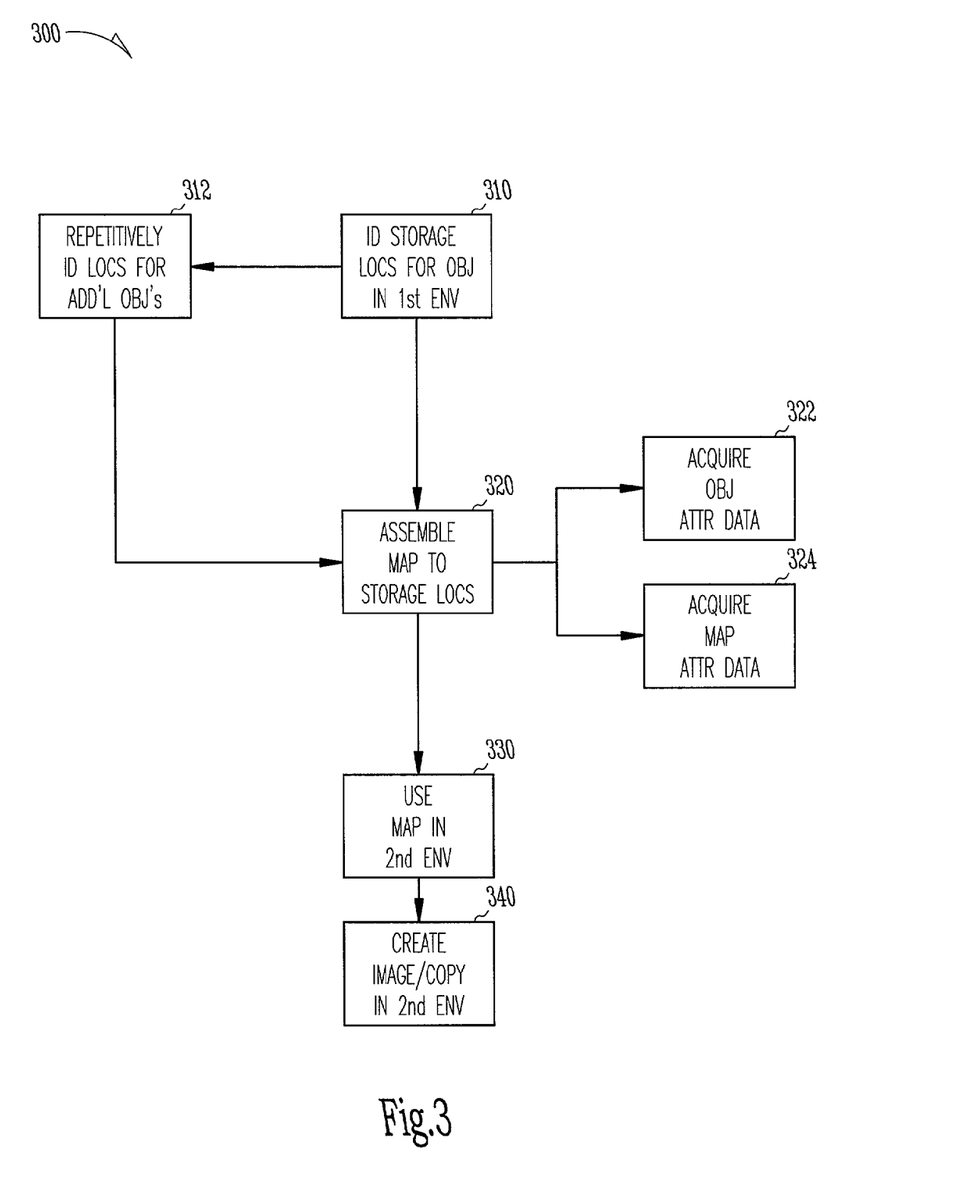
FIG. 3 shows one flowchart of a method to represent a data storage object according to the present invention.

FIG. 3 shows one flowchart of one method 300 to represent a data storage object according to the present invention. Initially, in step 310 one or more storage locations for the data storage object are identified within a first storage environment. In step 320, a hierarchical map representing a path to one or more of the storage locations is assembled. As previously presented, the representation of the map includes any data structure such as a tree, a binary tree, a heap, a list, a linked list, an array, a table, a hash table, a treap, and others. Further, in some embodiments the map is organized such that each node of the map represents a storage component within the first storage environment, such as a file system node identifying the file system being used within the first storage environment, a volume manager node identifying the volume manager responsible for correctly routing references to the data storage object to the appropriate physical storage devices, and partition or disks nodes representing the partitions or disks housing the data storage object.

Moreover, in some embodiments attribute data about the data object is acquired in step 322 and/or attributed data about the map and each node of the map is acquired in step 324. Attributed data includes information about the nodes and about the data object such as, and by way of example only, creation dates, access dates, byte sizes, naming conventions, number of accesses, and the like.

In other embodiments, the map is assembled to include one or more additional objects residing in the first storage environment. This is achieved by repetitively identifying additional storage locations associated with the additional objects as identified in step 312. In still other embodiments the data storage object includes a file system, a file, a database, or a portion of data within a file. In this way, an entire first storage environment is reproducible from the assembled map and easily transferred to a disparate storage environment.

Next, in step 330 the map is transferred or otherwise acquired in a second storage environment. In some embodiments, the map acquisition is directly acquired by a customized user set of executable instructions. In other embodiments, a customized user set of executable instructions is unaware that references to data storage objects are intercepted by one or more lower-level sets of executable instructions which have access to the map. In this way, the map is used to directly or indirectly interface the second storage environment with the first storage environment. Accordingly in some embodiments, an entire copy or image of the first storage environment is reproduced in the second storage environment.

Moreover in other embodiments, the first and second storage environments are really part of the same SAN environment, and are not disparate but rather remote from one another. In this way, details regarding the first storage environment can be shared across the SAN with various referencing or desiring applications.

Figure 4:
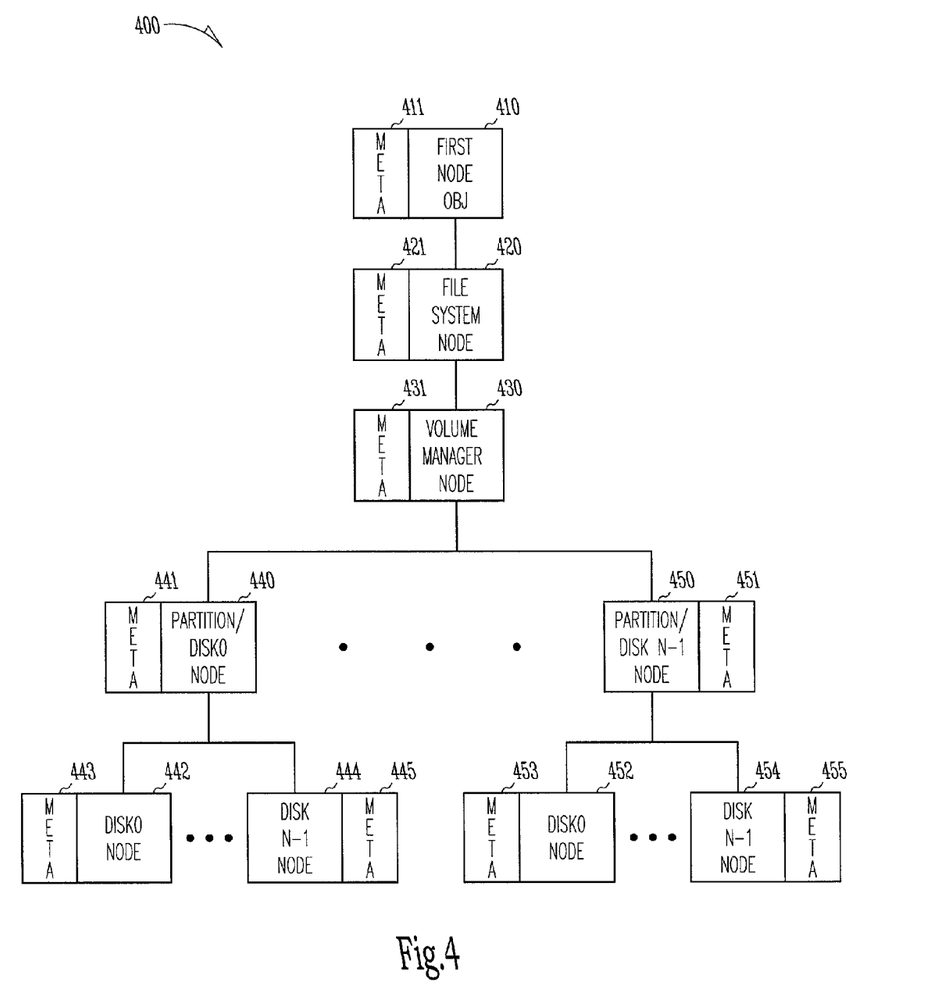
FIG. 4 shows one diagram of functional data used to represent a data object according to the present invention.

FIG. 4 shows one diagram of functional data 400 used to represent a data object according to the present invention. The functional data 400 provides a logical data representation of a data object's physical location within a computer readable medium, including all necessary access points within the computer readable medium necessary to gain access to the data object's physical location. As one skilled in the art will appreciate multiple computer readable media can house different aspects of functional data 400 as depicted in FIG. 4 and correspondingly although for illustrative purposes the functional data is described below as being within a single computer readable medium it is understood that multiple media can be used within the scope of the present invention. Furthermore, although functional data 400 appears in a tree data structure format it is understood that function data 400 includes any data structure or combination of data structures.

In some embodiments, functional data 400 resides in a first computer readable medium having a first storage environment and includes a root node or first node 410 representing a pointer to a data object. Moreover as previously presented and in some embodiments, metadata 411 is associated with the first node 410, wherein metadata 411 is broadly defined to include environmental data and statistical data. Although as is apparent, the metadata need not be physically within the first node 410, as any sufficient pointer or other resolution to acquire the metadata 411 is acceptable for purposes of the present invention. In fact, in some embodiments metadata 411 is associated with all the functional data 400 and is separately acquired.

Below the root node 410 of functional data 400 a file system node 420 represents a file system on a second computer readable medium having a second storage environment. This file system node 420 identifies the file system where the data object resides and is accessible from, namely the second storage environment. Also, in some embodiments the file system node 420 includes metadata 421.

After the file system node 420, a volume manager node 430 represents the volume manager associated with the file system. Again in some embodiments, the volume manager node 430 includes metadata 431. As previously presented and as is readily appreciated by those skilled in the art, a volume manager routes and controls access to the physical storage devices within a storage environment.

Under the volume manager node one or more partition or disk nodes 440 and 451 are identified and managed by the volume manager. In some embodiments, each partition or disk node 440 or 451 include metadata 441 and 451. The partition or disk nodes 440 and 451 identify multiple disks or storage devices housing the root node 410 in the second storage environment. Finally, each partition or disk node 440 and 451 is associated with one or more disk or sub-disk identifications 442, 444, 452, and 454. Further in some embodiments, each disk or sub-disk identification 442, 444, 452, and 454 include metadata 443, 445, 453, and 455, respectively. The disk or sub-disk identifications 442, 444, 452, and 454 include information to directly access the physical storage device housing the data object. In some embodiments, this is a serial number of the storage device, in other embodiments this is an IP address. In fact, any direct reference to the storage device housing the data object is intended to fall within the scope of the present invention.

In other embodiments, the disk or sub-disk identifications 442, 444, 452, and 454 include extent information permitting direct access within the appropriate storage device to acquire the contents of the physical storage representing the data object. In still other embodiments, the functional data 100 is a map and accessed by an accessing set of executable instructions which is associated with a second file system that is incompatible with the first file system. Further, the map is accessed by the accessing set of executable instructions from the first storage environment having the second file system. In this way, disparate storage environments and file systems interface with one another.

Moreover in some embodiments, if any value associated with the functional data 100 is altered or modified the functional data 100 is updated to reflect the modification. This provides a reliable representation of the functional data 100, making it more meaningful to sets of executable instructions using the functional data 100. Also, the data object can be utilized in a more persistent and reliable fashion, when changes to its storage locations are communicated or made available before any operation is performed against the data object. Moreover as is apparent to those skilled in the art, it may be more likely that sets of executable instructions using the functional data 100 discover after access to the data object that the data object has changed. In these situations and perhaps more typically, the using set of executable instructions can recover to an accurate and more updated version of the data object, with the above-presented embodiments.

Also in some embodiments, the functional data 100 is represented in extensible markup language (XML), making it portable across a wide variety of computing environments and potentially instantly pervasive across the Internet. In this way, the functional data 100 can be used to define storage environments and used in real time by remote disparate storage environments to obtain direct access to storage locations.

Figure 5:
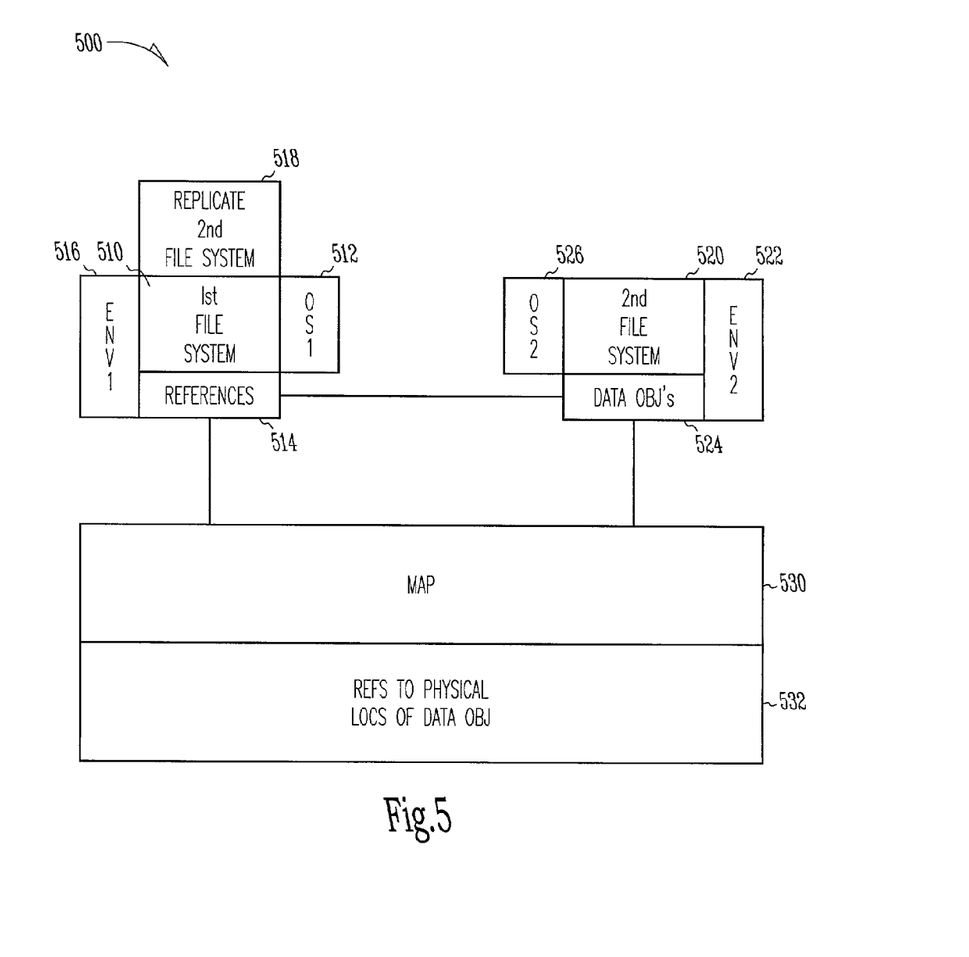
FIG. 5 shows one block diagram of a storage environment system according to the present invention.

FIG. 5 shows one block diagram of one storage environment system 500 according to the present invention according to the present invention. The system 500 includes a first file system 510, a second file system 520, and one or more data objects 524 residing in the second file system 520 and capable of being referenced within the first file system 510 by using map 530. Of course referencing from the first file system need not be a direct reference, as presented above, since the reference can be indirectly made through one or more intermediate sets of executable instructions providing an interface to the data objects 524 using the map 530.

The map 530 is generated to represent one or more of the physical locations 532 of the data objects 524. The map, in some embodiments, is used by the first file system 510 having a first operating system 512 in a first computing environment 516. In some embodiments, use by the first file system occurs through references 514 made to the data objects 524 within any set of executable instructions executing on the second computing environment 516.

Further in some embodiments, the representation includes any ordered sequence of low-level operations which the second file system 520, having a second operating system 526, requires when attempting to access the physical storage of the data objects 524 within a second computing environment 522. Moreover in still other embodiments, when one or more of the physical locations 532 or ordered sequence of accesses represented within the map 530 are changed the map 530 is updated to reflect the change.

In other embodiments, the first file system 510 is different from the second file system 520. Also, the first operating system 512 is different from the second operating system 526 and the first computing environment 516 is different from the second computing environment 522. Further in some embodiments, the references 514 are used to replicate the second file system 520 within the first file system 510 and its required format.

CONCLUSION

The methods, functional data and systems discussed above permits a logical and portable representation of a storage environment and data objects within a storage environment. In contrast to the past, one can now efficiently access and interface between disparate or remote but similar file systems, operating systems, storage environments, or computing environments. As one skilled in the art will appreciate, this is achieved with existing file systems, storage devices, and operating systems with no need for substantial revisions or adherence to any particular data communication standard.

Moreover, as will be apparent to those skilled in the art the present invention can be usefully deployed during the creation of a frozen image associated with the storage environment. In this way, data mirroring and data backup is more easily achieved with the tenets of the present invention by using the present invention to facilitate applications in creating frozen images of the storage environment.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method to map a storage environment data object, comprising:

receiving a reference to the data object in a first storage environment, wherein the data object resides in a second storage environment;

generating a first data structure from the reference representing one or more physical locations of the data object within the second storage environment;

associating a signature with the data object, wherein the signature is indicative of a state of the data object;

retaining the first data structure in the first storage environment;

updating the signature to reflect a change in the state of the data object, wherein a determination to update the signature is performed in the second storage environment;

querying the second storage environment for a change to the signature in preparation for a data access operation on the data object;

updating the first data structure if the signature has changed; and performing the data access operation using the first data structure to interface with one or more of the physical locations of the data object from the first storage environment.

2. The method of claim 1, wherein in retaining the first data structure one or more additional references access the data object using the first data structure.

3. The method of claim 1, wherein receiving the reference an operating system of the first storage environment does not support the second storage environment.

4. The method of claim 1, wherein during generation one or more extents of the data object within the second storage environment are provided.

5. The method of claim 4, wherein the generation further includes detecting a mirroring of the data object on at least two storage devices within the second storage environment.

6. The method of claim 1, wherein during generation metadata associated with the second storage environment and the data object are provided.

7. The method of claim 1, wherein in retaining the first data structure the first data structure is validated with one or more subsequent references made to access the data object.

8. The method of claim 1, wherein the method is used to interface a first database using the first storage environment with a second database using the second storage environment.

9. A method to represent a data storage object, comprising:

identifying one or more storage locations for the data storage object housed within a first storage environment;

assembling a hierarchical map representing a path to one or more of the storage locations;

associating a signature with the map indicative of a state of the data storage object;

querying the signature for changes in preparation for a data access operation on the data storage object;

updating the map if the signature has changed; and using the map in a second storage environment to access the data storage object.

10. The method of claim 9, wherein while assembling the map attribute data are acquired and associated with the first storage environment.

11. The method of claim 10, wherein assembling further includes acquiring attribute data associated with the data storage object.

12. The method of claim 9, wherein in identifying one or more of the storage locations, the data storage object is identified as at least one of a file system, a file, a database, a volume, and a portion of data within a file.

13. The method of claim 9, wherein the method is repetitively processed for one or more additional data objects residing in the first storage environment.

14. The method of claim 13, wherein the method is used to create an image or copy of the first storage environment in the second storage environment.

15. A first computer readable storage medium having a data map and a signature representing a data object residing on a second computer readable storage medium, wherein the signature is indicative of a state of the data object, the map comprising:

a first node representing the data object;

a file system node representing a file system on the second computer readable storage medium;

a volume node representing a volume manager associated with the file system;

one or more partition nodes managed by the volume manager;

one or more disk identifications representing one or more storage devices housing the data object; and wherein the map is updated when a change to the signature is detected.

16. The map of claim 15, wherein the map is represented as a tree data structure on the computer readable storage media.

17. The map of claim 15, wherein each node includes metadata.

18. The map of claim 15, wherein the map is used by an accessing set of executable instructions having access to a second file system which is incompatible with the first file system.

19. The map of claim 18, wherein the data object is referenced and modified by the accessing set of executable instructions from the second file system.

20. The map of claim 19, wherein the map is updated if one or more values associated with one or more of the nodes or identifications are modified.

21. A storage environment system, comprising:

at least one storage device;

a first file system stored on the at least one storage device;

a second file system stored on the at least one storage device;

one or more data objects residing in the second file system and capable of being referenced within the first file system;

a map generated to represent one or more physical locations for each of the one or more data objects and used by the first file system when one or more of the data objects are referenced, wherein the one or more physical locations comprise one or more locations on the at least one storage device; and a signature indicative of a state of the one or more data objects;

wherein the map is updated when changes are detected and associated with the signature.

22. The system of claim 21, wherein the map is modified when one or more of the physical locations for each of the one or more data objects changes.

23. The system of claim 21, wherein the file systems reside in different computing environments.

24. The system of claim 23, wherein the file systems operate within different operating systems.

25. The system of claim 24, wherein the map is used to replicate the second file system within the first file system in a first file system format.

26. The method of claim 1, further comprising:

creating a portable representation of the data structure using extensible markup language (XML); and distributing the portable representation to a third storage environment over the Internet.

* * * * *

UNITED STATES PATENT AND TRADEMARK OFFICE
CERTIFICATE OF CORRECTION

PATENT NO. : 7,293,030 B2  Page 1 of 1
APPLICATION NO. : 09/997602
DATED : November 6, 2007
INVENTOR(S) : Thomas W. Lanzatella et al.

It is certified that error appears in the above-identified patent and that said Letters Patent is hereby corrected as shown below:

Title page item 75 should read
Inventors:

Thomas W. Lanzatella, Graham Bromley, John A. Colgrove, Ron Karr, Blaine T. Cuykendall, Oleg Kiselev, Craig Harmer, Allen Unueco, Steven Michael Umbehocker Signed and Sealed this Eleventh Day of March, 2008

JON W. DUDAS
*Director of the United States Patent and Trademark Office*